Oct. 13, 1964     L. B. MOLLOY ETAL     3,152,534

PRESSURISATION SYSTEMS FOR AIRCRAFT

Filed April 15, 1960     5 Sheets-Sheet 1

INVENTORS
Louis Bryan Molloy
Owen Desmond Arthur
Charles Furlong
BY
Larson and Taylor Oct. 13, 1964   L. B. MOLLOY ETAL   3,152,534
PRESSURISATION SYSTEMS FOR AIRCRAFT
Filed April 15, 1960   5 Sheets-Sheet 2

INVENTORS
Louis Bryan Molloy
Oven Desmond Arthur Charles
Furlong
BY
Larson and Taylor

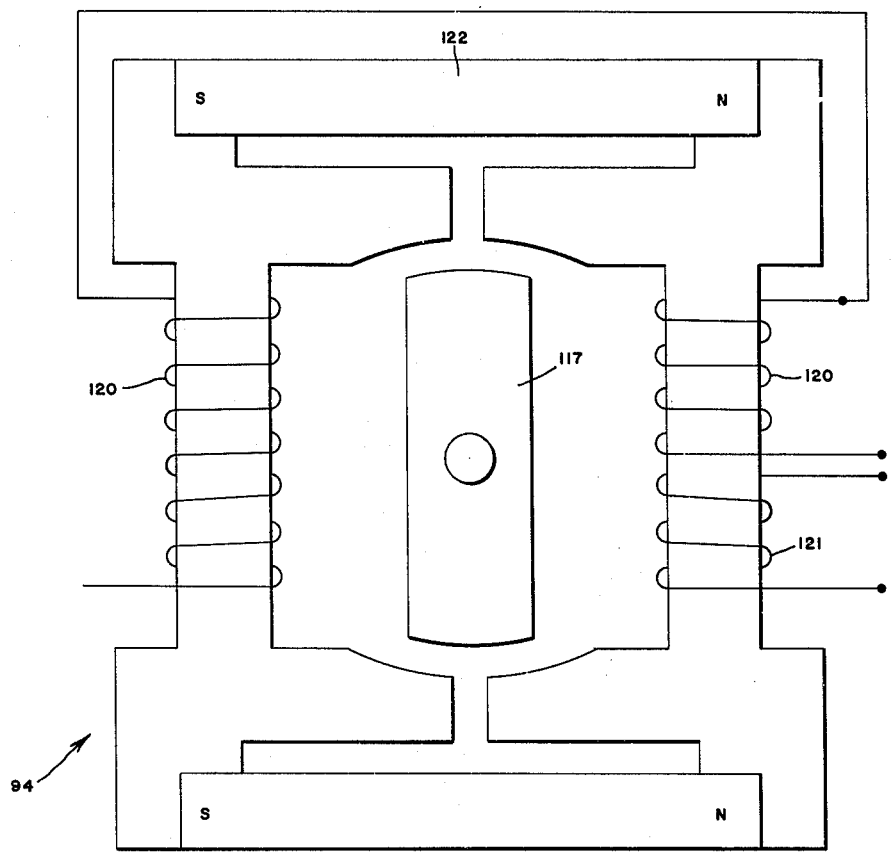

United States Patent Office 3,152,534
Patented Oct. 13, 1964

3,152,534
PRESSURISATION SYSTEMS FOR AIRCRAFT
Louis B. Molloy, Milborne Port, Sherborne, and Owen D. A. C. Furlong, East Coker, Yeovil, England, assignors to Normalair Limited, West Hendford, Yeovil, England
Filed Apr. 15, 1960, Ser. No. 22,531
Claims priority, application Great Britain Apr. 20, 1959
11 Claims. (Cl. 98—1.5)

This invention relates to cabin pressure control systems designed to provide means for controlling the cabin pressure during ascent, flight and descent of an aircraft without discomfort to the passengers. This is achieved by controlling the cabin altitude and the rate at which cabin altitude changes. It provides ascent and descent rates within a cabin substantially independently of the rates of ascent and descent of the aircraft. This system automatically reduces cabin pressure when the differential between the atmosphere and the cabin pressure reaches the maximum allowable value.

The invention relates to an electric, electronic and pneumatic pressure control system which determines the operation of one or more discharge valves, the input of air to the cabin being by any convenient means such as by tapping engine compressors or by means of special blowers.

An object of the invention is to retain the known advantages of pneumatically controlled discharge valves without the disadvantages of long conduits from the front of the aircraft (or from points of static pressure) and the possible condensation and freezing troubles.

A further object of the invention is to obtain control of pneumatically operated discharge valves such that substantially any failure such as might occur to them or their system results in the closing of the discharge valve or valves in the case of emergency. If a discharge valve were to open fully and suddenly at high altitude, the cabin pressure could rapidly decrease to an amount which could be dangerous to the aircraft's occupants.

The invention consists in aircraft cabin pressure control means incorporating pneumatically operated discharge valve means having control chamber means provided with air at less than cabin pressure, said air having its pressure controlled by electric and electronic means influenced by cabin altitude sensing means, cabin differential pressure sensing means and cabin rate of pressure change sensing means.

The invention also consists in pressure control means as in the preceding paragraph in which said altitude sensing means has chosen altitude manual setting means.

The invention also consists in pressure control means as in any of the two preceding paragraphs in which said control chamber has communication with cabin air by first restriction means and with lower pressure air by controlled second restriction means.

The invention also consists in pressure control means as in any of the three preceding paragraphs incorporating cabin altitude transducer means, cabin rate of pressure change transducer means, manual controlled means varrying rate of change of cabin pressure, current amplification, phase discrimination, and rectification means, motor means and servo valve means.

In order that the invention may be better understood and readily carried into effect certain embodiments thereof will now be described by way of example with reference to the accompanying drawings.

FIG. 7 shows diagrammatically the preferred type of motor for use in the system of the invention.

Figure 1:
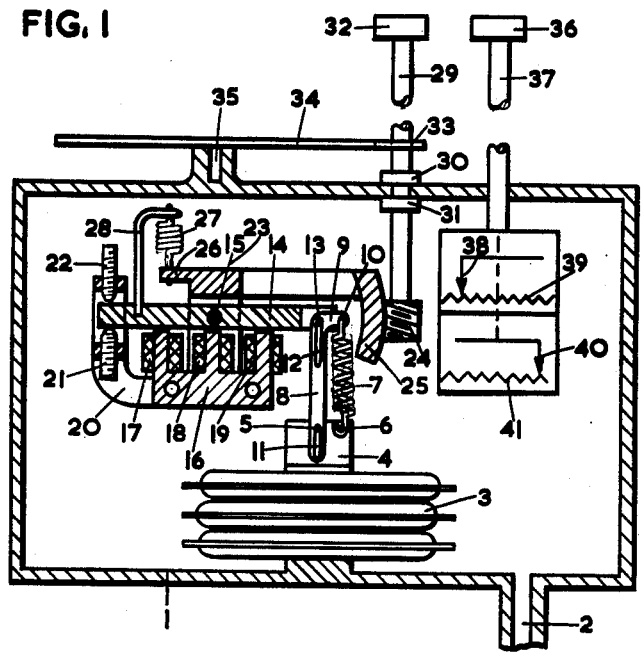
FIG. 1 shows diagrammatically the cabin altitude sensing transducer, altitude selection means and electrical means for changing rate of change of cabin pressure.

In carrying the invention into effect according to one convenient form by way of example as illustrated generally in FIG. 1, a transducer casing 1 open to the cabin by communication 2, has mounted inside it absolute capsules 3 with moving end fitting 4. This fitting carries central pin 5 and offset spring attachment pin 6 for spring 7.

Slotted link 8 has arm 9 with attachment hole 10 for the end of 7 remote from 6.

Adjacent to 6 is link slot 11 and at the other end of link 8 slot 12 allows movement of the link relatively to pin 13.

Pin 13 is fixed near the slotted end of I shaped swinging armature 14 which is pivoted at 15 near the middle of its length.

Armature 14 forms a portion of the transducer. The transducer in the preferred form employs a pick-off with an I shaped armature 14 and an E shaped core 16. The core 16 having a winding on each leg of the E. The winding 18 on the center leg of the core 16 acts in a manner as to provide excitation to the pick-off. The other two windings 17 and 19 are employed to provide an electrical output signal. This preferred form of pick-off hereinafter referred to as "an E and I pick-off" uses an alternating current in the winding 18 as the excitation current, and the two windings 17 and 19 are coupled in series, to provide an alternating electrical output signal, and in this way when the pick-off is coupled to a pressure sensitive device such as a capsule a transducer is formed which senses pressure and provides a related electrical output signal, thus constituting a monitor or linear variable differential transformer. Secured to 16 is a member 20 carrying screwed stops 21 and 22 and this member has pivots 23 (co-axial with pivot 15) around which the E and I portion of the pick-off portion of the transducer is partially rotated by worm 24 and worm segment 25 (secured to a portion of member 20). Arm 26 of member 20 is attached to spring 27 which has its other end carried by L shaped member 28 secured to armature 14. Springs 7 and 27 act upon 14 in an opposing manner.

Worm 24 is carried by shaft 29 located axially in casing 1 by collars 30 and 31.

Knob conveniently rotates shaft 29 and gear 33 meshes with gear wheel 34 (pivoted at 35) and having on its outer face markings indicating what cabin altitude is selected while the aircraft flies at varying heights.

Rate of pressure change variation knob 36 attached to shaft 37 moves wiper 38 over altitude winding 39 and at the same time moves wiper 40 over rate of pressure change winding 41, the sensitivity of one associated transducer being increased as the sensitivity of the other associated transducer is decreased and vice versa.

Figure 2:
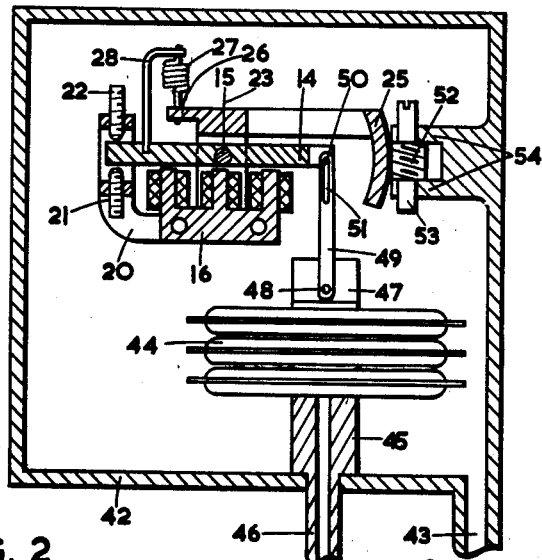
FIG. 2 shows diagrammatically the cabin differential pressure transducer.

Referring to FIG. 2 parts corresponding with those of FIG. 1 have been similarly numbered. Casing 42 has opening 43 communicating with cabin, and the differential pressure capsules 44 are secured to casing 42 by mounting 45. Pipe 46 communicates between the insides of capsules 44 and the ambient air 81 (static point).

Fitting 47 on capsules 44, carries pin 48 which is the fixing for link 49. Pin 50 in slot 51 is secured through I armature 14.

Worm 52, integral with adjustment shaft 53, rotates wormwheel and associated E of the E and I pick-off of the transducer until the desired setting is obtained. Worm 52 is located between jaws 54 formed from casing 42 (and the worm is locked by means not shown when setting is completed).

Figure 3:
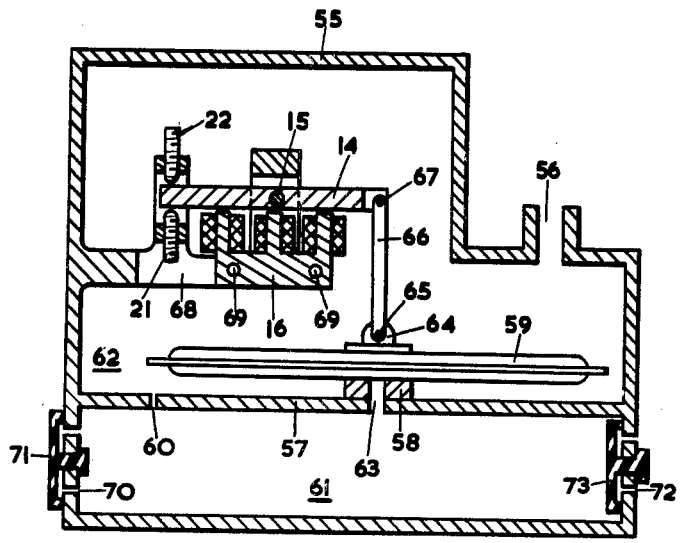
FIG. 3 shows diagrammatically the cabin rate of pressure change transducer.

Referring to FIG. 3, casing 55, open to cabin by means of 56, has a division 57 on which is mounted at 58 the sensitive capsule 59. Restriction means generally indicated as 60 in division 57 communicates capacity chamber 61 below 57 with chamber 62 above. The division 61 communicates with the inside of capsule 59 by the hole 63 through mounting 58. Member 68, shown as part of casing 55, mounts core 16 by rivets 69.

Fitting 64 carried by capsule 59 has securing pin 65 for link 66. Pin 67 is secured through armature 14 and the other end of link 66.

Chamber 61 has at its left end holes 70 and light flexible outwards relief valve 71 and at its right hand end holes 72 and light flexible inwards relief valve 73.

Figure 4:
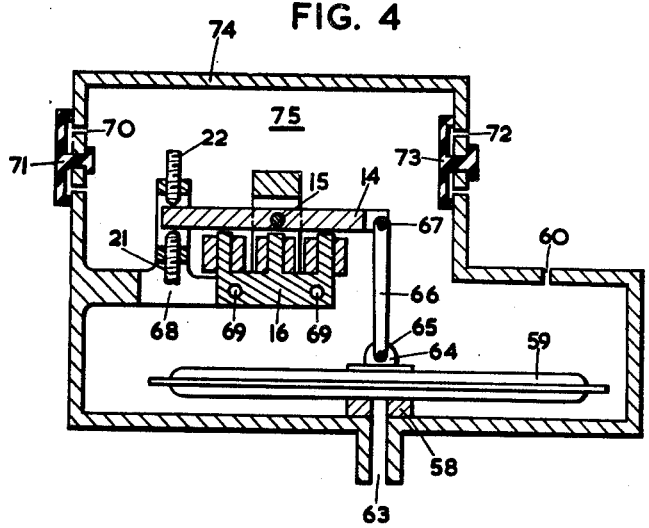
FIG. 4 shows diagrammatically a somewhat modified arrangement of the rate of pressure change transducer.

Referring to FIG. 4, items similar to those in FIG. 3 have the same numbers. Casing 74 has only one chamber 75, and hole 63 in mounting 58 communicates between the inside of capsule 59 and the cabin.

Apart from light relief valves 71 and 73 the only communication between chamber 75 and cabin is by way of restriction means generally indicated as 60.

Figure 5:
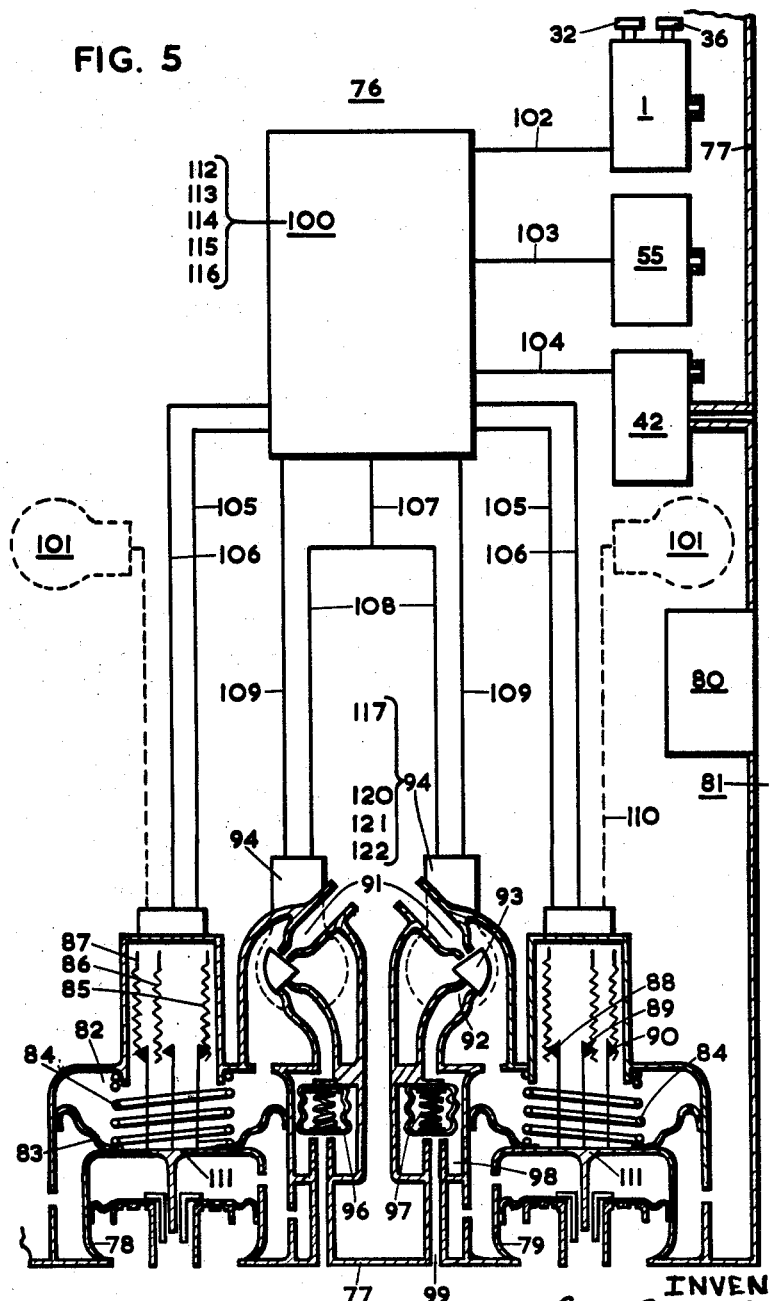
FIG. 5 shows diagrammatically sensing units, pneumatically operated discharge valves, and signal paths between units and valves, servo valves and their motors.
Figure 6:
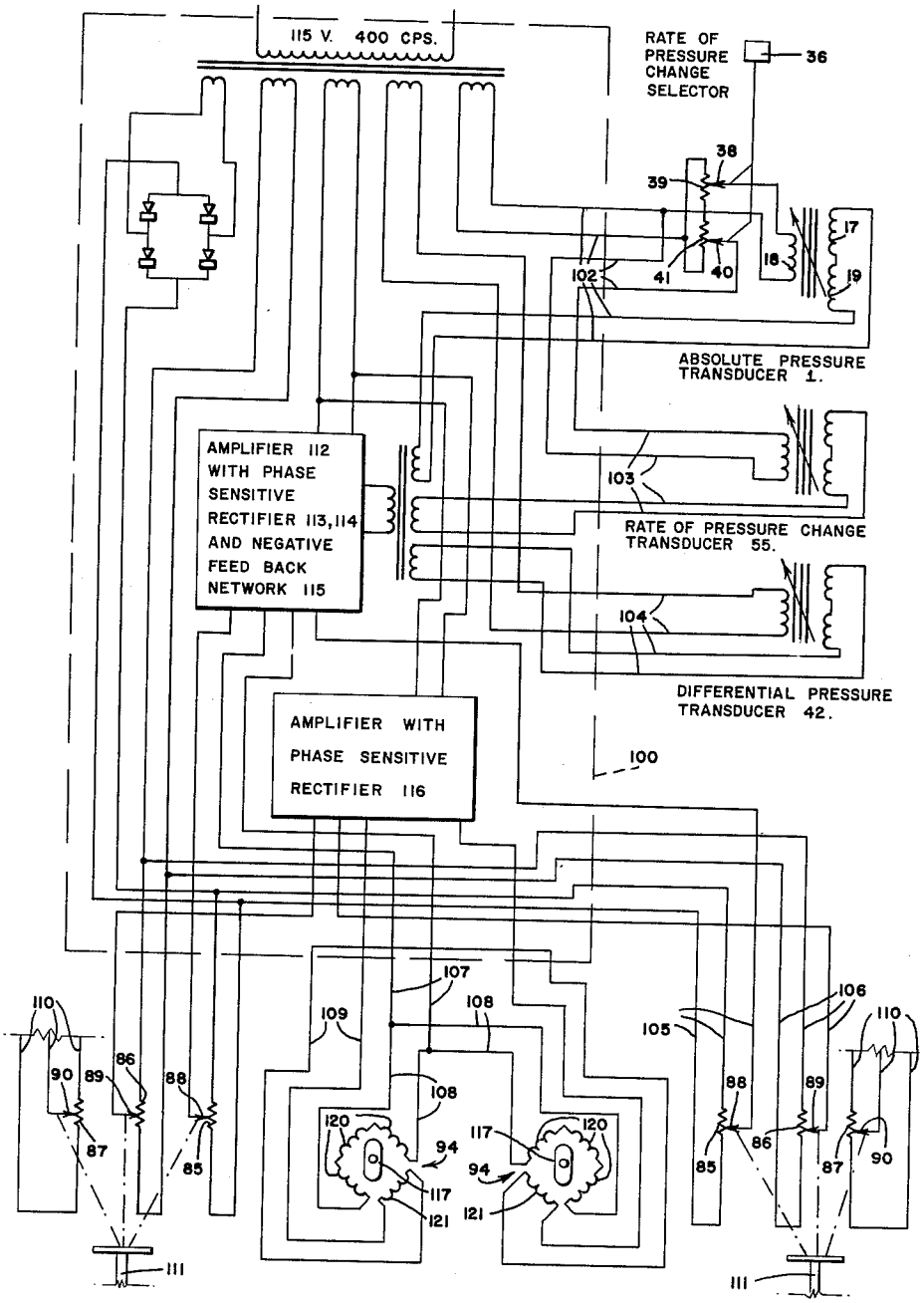
FIG. 6 shows an exemplary wiring diagram of a system according to the invention.

Referring to FIG. 5 and FIG. 6, transducers 1, 55 and 42 are shown in cabin 76, the walls of which are indicated at 77. Discharge valves 78 and 79 are similar (but for convenience of diagram are shown as "handed"). Safety valve 80 (of any convenient construction) communicates any excess air pressure from cabin 76 to ambient 81.

Control chambers 82 of discharge valves 78 and 79 are separated by flexible diaphragms 83 from portion of the valves below them subject to cabin pressure and control chamber pressure as well as pressure from spring 84 act on moving member means 111.

Cabin air is communicated to chamber 82 through first restriction means 91 and chamber pressure is lowered when air passes from it through second restriction means 92 to ambient by means of duct 99.

Between 92 and 99 is space 98 which contains evacuated capsule 96 having internal compression spring 97, and capsule 96 seals off duct 99 when pressure is below a chosen value—say corresponding with 9,000 ft. altitude.

The pressure prevailing in control chamber 82 is between that of cabin 76 and ambient 81 and is governed by servo valve 93 operated by motor 94 under the influence of sensing means in units 1, 55 and 42 and electronic amplification means generally indicated as contained in control unit 100.

Control chamber 82 contains spring 84 tending to close the discharge valve and thus retain cabin pressure. Chamber 82 also contains three sets of wipers 88, 89 and 90 moving in accordance with discharge valve travel over windings 85, 86 and 87. 87 and 90 are to indicate by distant electrical means 101 the relative openings of valves 78 and 79, 86 and 89 feed signals into control unit 100 tending to equalise the travels of valves 78 and 79 (to obtain desired flow distribution when a plurality of valves are used). Windings 85 and wiper 88 are connected with negative feed back and provide signals of movement of valves 78 and 79, these signals being communicated to control unit 100 and therein differentiated to give rate of change of valve movement.

Connecting sensing units and electronic control unit 100 are insulated conductors (having single or multiple cores as required) and shown as signal paths 102, 103, 104. Signals from units shown at 1, 55 and 42 are combined electrically in unit 100 which is conveniently supplied with alternating current from means not shown.

Unit 100 provides (by any known suitable means) signal current amplification—indicated by 112, phase discrimination 113 and rectification means 114.

Signals of discharge valve movement are fed via path 105 into unit 100 as negative feed back means 115, and the resulting signals are passed to motor 94 along paths 107 and 108.

In the case of a plurality of valves, flow proportioning means 116 in unit 100 communicate their signals to motors 94 along paths 109—valve positioning signals having been passed to unit 100 from windings 86 and wipers 89 by paths 106.

Motor 94 is of a known D.C. type and has armature 117 connected mechanically to servo valve 93.

The armature 117 is capable of moving through a small angle of about 7° each side of the axis of symmetry of the motor 94.

Motor main winding 120 connecting with path 108 has the major influence on deflection of armature 117 but flow proportioning coil 121 connecting with path 109 has a minor influence (which can be overridden by signals from 108 in the event of one valve failing in the shut position). Motor 94 has permanent magnets 122 biassing the armature toward the axis of symmetry of the magnets but as explained later this position is not attained in use with this invention.

The pressure cabin control means operates as follows—according to one convenient form by way of example, the cabin altitude pressure sensing transducer 1, the cabin differential pressure sensing transducer 42 and the cabin rate of change of pressure sensing transducer 55, operate separate E and I type pick-offs giving A.C. signals proportional to the positions of their armatures, mechanical stops being provided to limit the range of signals from the individual E and I's, these being capable of setting adjustment.

The signals from the above transducers are passed into an input transformer which has the effect of summing them algebraically. The combined signal output from this transformer is then fed into a transistorised electronic amplifier 100 which is comprised of the following stages, pre-amplification, phase discrimination, rectification, second stage amplification and power amplification.

The final power amplifier regulates the current flowing through major windings in each of the motors 94 mounted on the two pneumatic discharge valves 78 and 79. These motors 94 operate double acting servo valves 93 capable of regulating the air pressure in the discharge valve control chamber 82. The inlet side 91 of the double acting servo valve 93 allows air to enter the control chamber 82 from the cabin 76 and the outlet side 92 of the valve allows air to escape from the control chamber 82 to aircraft ambient static conditions by passage 99.

Built into each of the discharge valves are three linear potentiometers 85, 86 and 87 which give electrical signals proportional to the discharge valve head position.

One of the windings in these potentiometers in the discharge valves is connected via a capacitor to form a feedback circuit so that a signal proportional to the rate of change of valve position is fed back into the pre-amplification stage of the amplifier 112. This signal being in the opposite sense to the signal transmitted to the amplifier via the three pressure sensing means forms a negative feed-back to stabilise the system and prevent "hunting."

The second potentiometer winding on each of the discharge valves is connected up via a Wheatstone bridge type circuit and subsidiary amplifier so that the signals transmitted with valve movement are fed to the flow proportioning minor winding of each of the motors 94 mounted on the discharge valves 78 and 79. This circuit is so arranged that a balancing signal is thus supplied to motors 94 tending to make the discharge valves open and close together. Steps are taken however to ensure that the maximum signal transmitted to the discharge valve by this circuit is always limited to a value which can be overridden by the signals from the pressure sensing means. This ensures that if one discharge valve should fail shut for any reason, the system will not lose overall control.

The third potentiometer 87 on the discharge valve is available for valve position indication 101.

A cabin altitude sensing capsule pack exposed to cabin pressure is used to alter the position of an E and I type pick-off (16 and 14) so that a signal sufficient to regulate the discharge valve via the amplifier is given. Means 32 are provided to manually adjust the unit to control over a range of absolute cabin pressure and the maximum output signals from the E and I are limited by preset mechanical stops 21 and 22. The slotted link 8 and spring 7 are provided between the capsule 3 and the I armature 14 of the E and I pick-off, so as to introduce an overload prevention system. The slotted link 8 allows an "override" movement of the capsule to take place in either direction when the I armature 14 is on one or the other of its two mechanical stops 21, 22. In this way damage to the transducer which might have occurred through an excessive force from the capsule 3 will be avoided. Also fitted in the case of the altitude sensing control unit are two potentiometer windings 39 and 41 operated by a manual adjustment 36 which can regulate the excitation currents supplied to the E and I pick-off in the cabin altitude and cabin rate of change sensing transducers.

For the rate of change of cabin pressure sensing means a soft metallic capsule capable of responding to low differential pressures is used to operate an E and I transducer similar to that used in the cabin altitude sensing means. One side of the capsule is open directly to cabin pressure and the other side of the capsule is open to cabin pressure via a small leak and capacity. This capsule arrangement is similar to that used in standard rate of change indicators. Mechanical stops are provided to limit the range of output signals from the E and I and the unit is set so that no signal is given when the cabin rate of change is zero. The rate of pressure change at which the capsule brings the E and I into a controlling position is varied by altering inversely to each other the excitation of both the altitude and rate of change capsules transducers. This is achieved in practice by altering the manual control knob 36 on the cabin altitude sensing means.

For the differential pressure sensing transducer a capsule is employed one side of which is exposed to cabin pressure and the other side of which is exposed to the aircraft ambient altitude pressure. As in the case of the other two sensing transducers this unit operates an E and I type pick-off. The unit is set to control at the desired differential pressure. At pressures below this, the I rests on a stop which is set to give zero output signal.

The basic characteristic of the servo valve motor is such that when no current is passed through the coils, the permanent magnets built into the unit tend to cause the armature to move to the axis of symmetry of the magnets. As the current through the coils is increased, so the armature moves against the magnetic bias away from the off position through an angle which reaches at its maximum 7°.

The requirement of the amplifier of the control unit 100 is such that it provides power to move the armature 117 of the motor 94 into the required controlling position against the force of the flux set up by the permanent magnets 122. Each servo valve 93 is arranged such that when it is closed against the seating of its respective second restriction 92 the armature 117 is biassed 2° off the axis of symmetry of the motor 94. In this way, there is 5° of movement available for the control of airflow through restrictions 91 and 92. When the motor 94 is in a condition of "power off" the valve 93 is loaded onto the seating of second restriction 92 by a magnetic force derived from the 2° of movement of the armature 117.

By arranging the system to operate in this way under all flight conditions, the servo valve 93 is under the control of the amplifier's output which operates with a current greater than that necessary to overcome the initial 2° of movement of the armature 117. Should the current from the control unit to the motor 94 fail, the second restriction 92 will be closed by the servo valve 93.

The servo valve 93 which controls air passing through second restriction means 92 conveniently also controls airflow from cabin 76 through first restriction 91 when servo valve 93 is suitably operated but control of 91 is not to be considered as essential since the restriction 91 itself would suffice.

It is preferred however, from the point of view of discharge valve operation to prevent cabin air entering the control chamber at such time as it is desired to open the discharge valve substantially—as for instance before cabin pressurisation commences.

The three E and I pick off armatures are set by set screw means to have convenient travels.

The signal which can be obtained when the altitude sensing armature is on its stop can be overridden by the action of the cabin rate of pressure change armature.

In addition the signal which can be obtained when the cabin rate of pressure change armature is on its stop is also overridden by the action of the differential pressure armature.

Although a plurality of discharge valves are shown in FIG. 5 it is to be understood that the invention also relates to the use of one discharge valve—said valve having associated potentiometer means for negative feedback but not requiring airflow proportioning potentiometer means.

In operation the rate of change of pressure capsule 59 is relieved of more load than is desired by the action of the light inwards and outwards relief valves provided for spaces 61 and 75.

Although in FIG. 5 42 is indicated as separate from 55 it is to be understood that these two units can be combined if the exteriors of capsules 44 and 59 each subjected to cabin pressure.

In another example (not shown) casing 74 of FIG. 4 is superimposed on casing 42 of FIG. 2 so that cabin air which surrounds capsule 44 freely enters the inside of capsule 59 (of FIG. 4).

In another example (not shown) casings 1, 42 and 55 are combined such that cabin air surrounds capsules 3, 44 and 59.

It is also to be understood that flexible mountings are provided for all units which might otherwise be subject to malfunctioning due to the occurrence of substantial vibrations.

It is to be understood that with pneumatically operated discharge valves of the type described, having control chamber means subjected to a pressure less than the prevailing cabin pressure, any sudden increase of air flow into the pressure cabin tends pneumatically to open the discharge valve (even if the electrical signal were not sent to effect this valve movement) and the speed of response of the valve is influenced by the extent of such sudden changes in cabin conditions.

Although it has been convenient to use E and I pick-off means with pressure sensing means, it is to be understood that other known transducers can be used with this invention (other than E and I pick-offs)—particularly bar armatures moving inside coil means.

It is also to be understool that although alternating current devices have been used with means included in this invention, direct current means can be used instead with other known means controlling pneumatically operated discharge valves.

It is also to be understood that although pneumatically operated discharge valves have been used in this invention and said valves conveniently move axially, other forms of valves can be used, including butterfly valves operated by air motors said motors being controlled by electrical signals from pressure sensing transducers.

We claim as our invention:

1. An aircraft pressurized cabin pressure control system comprising: pneumatically operated discharge valve means for controlling the exhaust of air from said pressurized cabin; said discharge valve means having associated therewith pneumatic control chamber means; said control chamber means being in communication with air at cabin pressure by way of a first restriction and with air at a pressure less than cabin pressure by way of a second restriction; valve means for controlling the flow of air through said second restriction; and means for proportionally controlling said valve means in response to an electrical signal derived as a function of cabinet altitude, cabinet differential pressure, and cabinet rate of pressure change.

2. An aircraft pressurized cabin pressure control system providing proportional control comprising: pneumatically operated discharge valve means for controlling the exhaust of air from said pressurized cabin; pneumatic control chamber means for operating said discharge valve means; first restriction means providing communication between said control chamber and air at substantially cabin pressure; second restriction means providing communication between said control chamber and air at a pressure less than cabin pressure; valve means controlling air flow through said second restriction; said valve means being proportionally controlled by motor means responsive to an electrical signal; cabin altitude sensing transducer means, cabin differential pressure sensing transducer means and cabin rate of pressure change sensing transducer means each providing alternating current outputs; and means for summarizing and amplifying the resultant of said outputs which is further rectified to provide said electric signal.

3. An aircraft cabin pressure control system as claimed in claim 2, wherein said transducers incorporate E and I pick off core and armature means, said cabin altitude sensing transducer having preselected altitude manual setting means, and manually adjustable means for varying the relation between the outputs of said cabin altitude sensing transducer and said cabin rate of pressure change sensing transducer to provide a variable rate of pressure change setting.

4. An aircraft cabin pressure control system providing proportional control comprising: pneumatically operated discharge valve means controlling the exhaust of air from the pressurized cabin; pneumatic control chamber means associated with said discharge valve means; first restriction means providing communication between said control chamber and air at substantially cabin pressure; second restriction means providing communication between said control chamber and air at a pressure less than cabin pressure; valve means controlling air flow through said second restriction; said valve means being proportionally controlled by motor means responsive to an electrical signal; cabin altitude sensing transducer means, cabin differential pressure sensing transducer means and cabin rate of pressure change sensing transducer means, each providing alternating current outputs; means including a phase sensitive rectifier, for summarizing said outputs to provide a current; and electrical feed back means responsive to discharge valve rate of movement for modifying said current to provide said electric signal, whereby said discharge valve means is restrained from hunting.

5. An aircraft pressurized cabin pressure control system providing proportional control comprising: two pneumatically operated discharge valve means for controlling the exhaust of air from said pressurized cabin; pneumatic control chamber means associated with each of said discharge valve means; first restriction means providing communication between said control chambers and air at substantially cabin pressure; two second restriction means providing communications between respective ones of said control chambers and air at a pressure less than cabin pressure; separate valve means controlling air flow through respective ones of said two second restrictions; respective ones of said valve means being controlled by separate motor means having limited angular movement, said motors each having windings including main coil means and flow proportioning coil means, said motors being primarily controlled by an electrical signal acting with said main coils; means for generating said signal as a function of cabin altitude, cabin differential pressure, and cabin rate of pressure change; said motor means also being controlled to a secondary minor degree by a flow proportioning signal acting with said flow proportioning coils such that in effect the flow proportioning coils are in opposition; said flow proportioning signal being derived from means sensing and comparing the openings of said discharge valves.

6. An aircraft cabin pressure control system comprising: pneumatically operated discharge valve means for controlling the exhaust of air from a pressurized cabin; said discharge valve means having associated therewith control chamber means; said control chamber means being in communication with air at cabin pressure by way of a first restriction and with air at a pressure less than cabin pressure by way of a second restriction; valve means for differentially controlling the flow of air through said first and second restrictions; said valve means being proportionally controlled by motor means responsive to an electrical signal derived from the summation of outputs from cabin altitude sensing transducer means, cabin differential pressure sensing transducer means and cabin rate of pressure change sensing transducer means; and means for generating said electric signal.

7. An aircraft pressurized cabin pressure control system comprising: pneumatically operated discharge valve means for controlling the exhaust of air from said pressurized cabin; said discharge valve means having associated therewith control chamber means; said control chamber means being in communication with air at cabin pressure by way of a first restriction and with air at a pressure less than cabin pressure by way of a second restriction; valve means for controlling the flow of air through said second restriction; motor means for proportionally controlling said valve means in response to an electric signal; said motor means having biasing means tending to close said second restriction by said valve means upon failure of said signal; said signal being derived from the summation of outputs from cabin altitude sensing transducer means, cabin differential pressure sensing transducer means and cabin rate of pressure change sensing transducer means; and means for generating said signal.

8. An aircraft cabin pressure control system comprising: pneumatically operated discharge valve means for controlling the exhaust of air from a pressurized cabin; said discharge valve means having associated therewith control chamber means; said control chamber means being in communication with air at cabin pressure by way of a first restriction and with air at a pressure less than cabin pressure by way of a second restriction; valve means for controlling the flow of air through said second restriction; motor means for proportionally controlling said valve menas in response to an electrical signal; said motor means having magnetic biasing means tending to close said second restriction by said valve means upon failure of said signal; said signal being derived from the summation of outputs from cabin altitude sensing transducer means, cabin differential pressure sensing transducer means and cabin rate of pressure change sensing transducer means; and means for generating said signal.

9. An aircraft pressurized cabin pressure control system providing proportional control comprising: two pneumatically operated discharge valve means controlling the exhaust of air from said pressurized cabin; control chamber means associated with each of said discharge valve means; first restriction means providing communication between said control chambers and air at substantially cabin pressure; two second restriction means providing communication between respective ones of said control chambers and air at a pressure less than cabin pressure; separate valve means controlling air flow through respective ones of said two second restrictions, respective ones of said valve means being controlled by separate motor means having limited angular movement; said motors each having windings including main coil means and flow proportioning coil means; said motors being controlled by an electric signal acting with said main coils; said signal being derived from cabin altitude sensing transducer means, cabin differential pressure sensing transducer means and cabin rate of pressure change transducer means; said motor means also being controlled to a secondary minor degree by a flow proportioning signal acting with said flow proportioning coils, such that in effect the flow proportioning coils are in opposition; means sensing and comparing the openings of said discharge valves for generating said flow proportioning signal; said flow proportioning signal being arranged such that if either one of said discharge valve means were to fail shut, the maximum flow proportioning signal is limited to a value which can be overridden by said electrical signal, such that the system will not lose overall control; and means for generating said electric signal.

10. An aircraft pressure control system comprising: pneumatically operated discharge valve means for controlling the exhaust of air from a pressurized cabin; said discharge valve means having associated therewith control chamber means; said control chamber means having a portion of a wall formed by a pressure responsive moving member; said member being exposed on one side to cabin pressure and on the opposite side in said control chamber to a control pressure less than cabin pressure; said control chamber being in communication with cabin air by way of a first restriction means; said control chamber also being in communication with air at a predetermined minimum absolute pressure by way of a second restriction means; valve means controlling the air flow through said second restriction; said valve means being proportionally controlled by motor means responsive to an electric signal; said motor means having a limited angular movement and a magnetic bias arranged so as to tend to close said second restriction by said valve means when said motor is unenergized; and means for generating said electric signal.

11. An aircraft pressurized cabin pressure control system comprising: pneumatically operated discharge valve means for controlling the exhaust of air from said pressurized cabin; pneumatic control chamber means for operating said discharge valve means in response to pressures in said control chamber; first means communicating said control chamber with air at cabin pressure; second means communicating said control chamber with air at less than cabin pressure; third means for adjustably controlling the flow of air through said second means in response to an electric signal; and means for supplying and controlling said electric signal as a function of cabin altitude, cabin differential pressure, and the rate of change of cabin pressure.

References Cited in the file of this patent
UNITED STATES PATENTS

| | | |
|---|---|---|
| 2,473,776 | Baak | June 21, 1949 |
| 2,549,673 | Del Mar | Apr. 17, 1951 |
| 2,578,026 | Taylor | Dec. 11, 1951 |
| 2,585,295 | Baak | Feb. 12, 1952 |
| 2,589,597 | Baak | Mar. 18, 1952 |
| 2,767,637 | Maas | Oct. 23, 1956 |
| 2,814,241 | Silver | Nov. 26, 1957 |
| 2,973,702 | Andresen | Mar. 7, 1961 |
| 2,983,211 | Andresen | May 9, 1961 |

FOREIGN PATENTS

| | | |
|---|---|---|
| 1,242,133 | France | Aug. 16, 1960 |

UNITED STATES PATENT OFFICE
CERTIFICATE OF CORRECTION

Patent No. 3,152,534

October 13, 1964

Louis B. Molloy et al.

It is hereby certified that error appears in the above numbered patent requiring correction and that the said Letters Patent should read as corrected below.

Column 7, lines 15 and 16, for "cabinet", each occurrence, read -- cabin --.

Signed and sealed this 30th day of March 1965.

(SEAL)
Attest:

ERNEST W. SWIDER
Attesting Officer

EDWARD J. BRENNER
Commissioner of Patents